Oct. 22, 1940.                W. C. HERMAN                2,219,184
                      VARIABLE SPEED TRANSMISSION
                  Filed Sept. 15, 1938        2 Sheets-Sheet 1

INVENTOR
WALLACE C. HERMAN
BY Henry Silberis
ATTORNEY

Oct. 22, 1940.   W. C. HERMAN   2,219,184
VARIABLE SPEED TRANSMISSION
Filed Sept. 15, 1938   2 Sheets-Sheet 2

INVENTOR
WALLACE C. HERMAN
BY Henry Silbereis
ATTORNEY

Patented Oct. 22, 1940

2,219,184

UNITED STATES PATENT OFFICE 2,219,184

VARIABLE SPEED TRANSMISSION

Wallace C. Herman, Dayton, Ohio

Application September 15, 1938, Serial No. 229,985

15 Claims. (Cl. 74—286)

The principal object of this invention is to provide a variable speed transmission which includes a plurality of endless members or belts which travel over pulleys, the flanges of which are relatively movable toward and away from each other to vary the arcs which the belts travel around the pulleys to vary the speed ratio between the driving and the driven members.

Another object of the invention is to provide pulleys, the flanges of which are relatively movable toward and away from each other to vary the arcs which the belts travel around the pulleys automatically without the aid of springs of any mechanical means, the pulley flanges being so constructed that they assume their properly adjusted positions through the pressure applied thereto by the edges of the belts themselves.

The present invention is an improvement over the construction such as that shown in Letters Patent of the United States No. 2,035,269, issued to O. I. Judelshon on March 24, 1936, in that the pulleys in said patent are shifted by a cam means which requires a gear train or other mechanism to operate the cam, and special connections from such operating mechanism to properly shift the cam, whereas in my invention no mechanism is required, since the relative adjustment of the pulley flanges is effected by the belts themselves.

It is a further object to combine the pulleys of the above construction with a novel differential device in such a way that the power can be applied through the belts to a plurality of separate shafts at variable speeds and producing variable output speeds to a single output shaft. The gear ratios of the differential can be so proportioned that the speed of the output shaft can be varied from a maximum speed to a stop, or into reverse, by simply changing the position of the axis of the driving pulleys.

With these and incidental objects in view, the invention includes certain novel features of construction and combinations of parts, the essential elements of which are set forth in appended claims and a preferred form or embodiment of which is hereinafter described with reference to the drawings which accompany and form a part of this specification.

Figs. 4, 5, 6, and 7 are diagrammatic views showing four applications of the invention.

Figure 7:
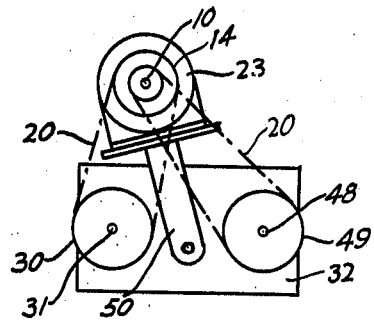
Figure 8:
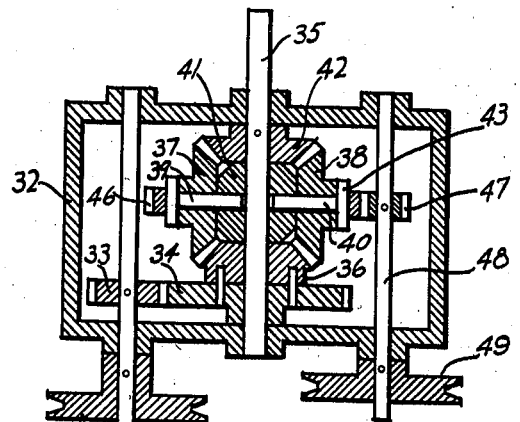

Fig. 8 is a cross sectional view of the differential mechanism used in the application of the invention shown in Fig. 7.

General description

In general, my invention consists of a central shaft on which is mounted a hub or collar. This hub or collar can be secured to the shaft by any known method, such as a key, as illustrated herein, or the hub or collar may also be made a running fit on the shift if so required. The outer disks of the pulley cones are secured together and this unit is slidable on the hub and positively rotatable therewith. Central disks of the cones are slidable on the hub and have projections engaging slots of the outer disks so that the inner disks are slidable relatively to the outer disks, but are driven by the outer disks. V belts are placed in the grooves formed by the outer and inner disks, and when the V belt riding in the groove forming the largest pitch diameter is forced downwardly, it will force the belts riding the groove forming the smallest pitch diameter upwardly. When this action takes place, the disks of the pulley being free to slide sidewise, the pulleys will automatically slide therewith and the belts will remain in true alinement at all times. Thus it is understood that the novel construction of the pulley is such that the belts themselves will always shift the disks of the cones into proper alinement without the aid of any incidental mechanism such as that shown in the patent referred to, or any other means such as springs, etc.

Figure 4:
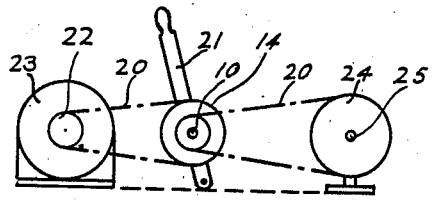
Figure 5:
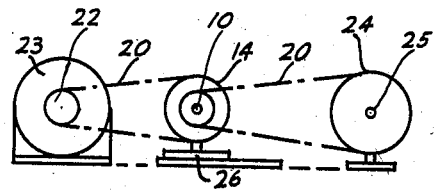
Figure 6:
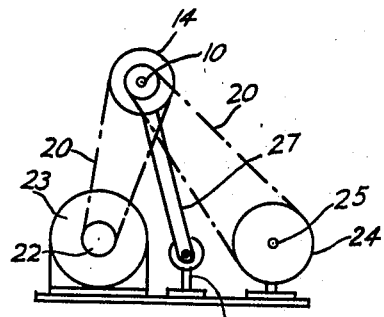

The novel pulley can be applied in any of a number of drives, such as shown in Figs. 4 to 6. In Figs. 4 and 6, the pulleys are carried on a lever pivoted between the source of power and the driven means. Fig. 5 shows the pulleys mounted on a slide instead of a lever. In each of these three applications, the pulleys are shifted to vary the distance between them and the driven and driving shafts, thus varying the effective pitch diameters of the novel pulley unit to vary the speed of the driven shaft.

In Fig. 7, the motor, or source of power, is mounted on a pivoted support and the novel pulley unit is carried on the motor shaft. When the motor support is rocked to move the axis of the pulley shaft, the relative action of the pulley disks is the same as above described, and the relative speeds of the two driven pulleys are varied.

The two driven pulleys are connected to a differential mechanism illustrated in Fig. 8, which differential transmits a resultant speed to the output shaft. The output speed is varied from a maximum speed to a position of rest and into reverse, depending upon the position of the axis of the motor shaft.

*Detailed description*

A hub or collar 11 is securely mounted on a shaft 10 in any well-known manner, such as by a key 12 when used in the embodiment of the invention shown in Figs. 7 and 8 or it may be made a running fit on shaft 10 as required, when used in the embodiment shown in Figs. 4 to 6. The hub is splined at 13 to slidably receive extensions of the inner peripheries of outer disks 14. By this construction, the disks 14 are slidably mounted on the hub 11 and are rotatable therewith. The outer disks 14 are provided with slots 15 to receive projections 16 of inner disks 17. The disks 17 are loosely mounted on the hub 11, but are rotated with the disks 14, due to the connection between the disks consisting of the slots 15 and projections 16. The disks 14 are secured together to rotate as a single unit by bolts 18. In the form of the invention disclosed in Fig. 2, the inner disks 17 are connected to move as a unit by bolt 19.

Rotation of shaft 10 and collar 11, or the collar alone, rotates the disks 14, which, through the projections 16 engaging in slots 15, rotate the inner disk or disks 17 therewith.

V belts 20 are inserted between the inner disks 17 and the outer disks 14, and the disks are so spaced that there is sufficient space between the disks to locate one belt at the outermost pitch diameter and the other belt at the innermost pitch diameter of the pulley unit. The side angular edges of the belt and pulleys are such that when one belt is forced from the outermost pitch diameter position, it will cam the other belt toward its outermost pitch diameter position, thus widening the groove between the one pair of disks 14—17 and narrowing the groove between the other pair of disks 14—17. Inasmuch as the disks 14 and 17 are each slidable on the collar 11, both are shifted sidewise to accommodate the grooves of the pulley to the line of travel of the belts. Thus, by providing two shiftable sets of disks 14 and 17, the pulley adjusts itself according to the line of travel of the belts.

This action of the V belts within the pulley disks can therefore be called "hunting," because the V belts actually hunt their own true alinement position regardless of the pitch diameter for which they are set within the grooves of the pulleys. Therefore no mechanical means (such as that shown in the above-mentioned patent) is required to compensate for the misalinement of the V belts.

Figure 1:
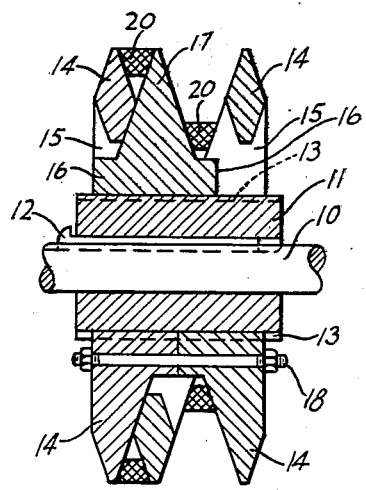
Fig. 1 is a cross section taken through the driving pulleys, showing a pulley assembly for driving two belts, taken on line 1, 2—1, 2 of Fig. 3.
Figure 2:
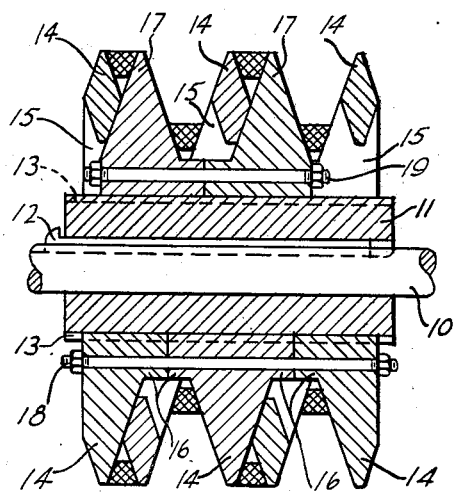
Fig. 2 is a cross section taken through the driving pulleys, showing a pulley assembly for driving four belts, taken on line 1, 2—1, 2 of Fig. 3.
Figure 3:
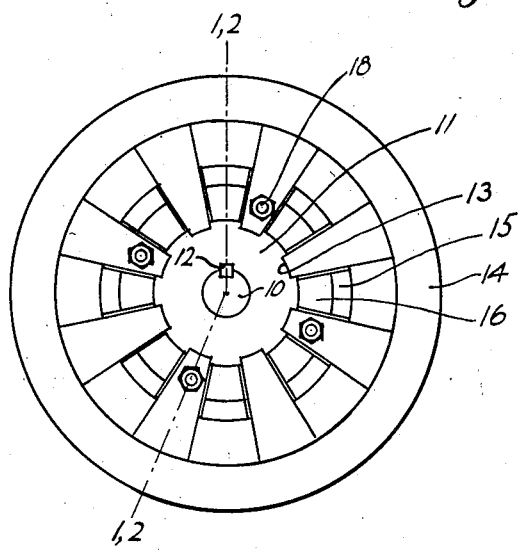
Fig. 3 is a side elevation of the pulleys shown in Figs. 1 and 2.

The same action takes place if the form shown in Fig. 1 or the form shown in Fig. 2 is used. The difference between the two forms lies in the fact that by using a plurality of V belts, more power is transmitted. While Fig. 2 shows the use of two pairs of V belts, any number of pairs of V belts can be used. It is, therefore, not intended to limit the application of the invention to the exact number of V belts disclosed in Figs. 1 and 2.

In the form of the invention disclosed in Fig. 4, the shaft 10 is mounted stationary on a pivoted manipulative device, illustrated in the form of a lever 21. One V belt 20 is led around a pulley 22 on the shaft of a motor 23. The other V belt 20 is led around a pulley 24 on a driven shaft 25. By this form of the invention, the pulley 22 has a fixed speed of rotation and the speed of rotation of the driven shaft 25 is varied by moving lever 21 in one direction or the other, whereupon the V belts 20 move up or down to change the effective pitch diameter of the self-adjusting pulley units.

Fig. 5 discloses an application of the invention similar to that disclosed in Fig. 4, except that the pulley shaft 10, together with the variable pitch diameter pulley, is mounted in a standard 26, slidable on a fixed base. The result obtained is the same as that explained for the form shown in Fig. 4.

In Fig. 6, another application is illustrated, in which the variable pitch diameter pulley, through its shaft 10, is mounted at the free end of a link 27 pivoted on a base 28. In this form, the variable fixed pulley is mounted to provide a minimum of space between the motor and the driven shaft. Otherwise this form of the invention functions in the same manner as in the form shown in Figs. 4 and 5.

Figs. 7 and 8 disclose an application of the invention in combination with a differential means whereby a greater variation in speed can be obtained for the driven shaft. In this form, the combined variable speed obtained from the variable speed pulley and the differential makes it possible not only to vary the speed of the output shaft, but also to bring the output shaft to rest, and furthermore, by using the proper ratio of gears in the differential means, the output shaft can be reversed in its direction of rotation.

In the form shown in Figs. 7 and 8, one or more of the V belts 20 (depending upon whether the Fig. 1 or Fig. 2 pulleys are used) are fed around pulley or pulleys 30 secured to a shaft 31 in any well-known manner. The shaft 31 rotates in bearings of a housing 32 of the differential means. Also secured on shaft 31 (Fig. 8) is a pinion 33, meshing with a gear 34 rotatable on the output shaft 35 also rotatable in the housing 32. Secured to gear 34 is a bevel pinion 36, which meshes with two planet gears 37 and 38. The planet gears 37 and 38 are rotatable on studs 39 and 40, respectively, carried by a core 41 which is assembled in a spider 43 rotatable on the output shaft 35. The planet gears 37 and 38 mesh with a gear 42, secured to the output shaft 35.

Fast to the spider 43 is a ring gear 36, in mesh with, and driven by, a pinion 47 secured to a shaft 48 rotatable in bearings of the housing 32. A pulley or pulleys 49 are secured to the shaft 48 and are driven by V belt or belts 20.

Rotation of the shaft 48, through pinion 47, rotates the ring gear 46 and the spider 43, thus carrying the planet gears 37 and 38 around the output shaft 35, while rotation of shaft 31, through pinion 33, gear 34, and bevel pinion 36, rotates the planet gears 37 and 38 on their studs 39 and 40 and tends to rotate the pinion 42 and output shaft 35 at a certain speed. However, the rotation of the spider 43, through shaft 48, revolves the planet gears 37 and 38 to change the resultant speed of rotation of the output shaft 35.

From the above it is apparent that if the speeds of rotation of the two shafts 31 and 48 are varied by the change of effective pitch diameter of the variable speed pulley on shaft 10, the output shaft 35 will also vary in speed of rotation.

As illustrated in Fig. 7, and assuming that the motor shaft 10 rotates clockwise, the two shafts 31 and 48 will also rotate clockwise. As illustrated, the shaft 31 will rotate at a faster rate than shaft 48. The shaft 10 and the variable speed pulleys are shown mounted on a frame 50 pivoted on the housing 32. By rocking the frame 50 clockwise on its pivot, the effective pitch diameter of the variable speed pulley will be changed, as above described, thus decreasing the speed of rotation of shaft 31 and increasing the speed of rotation of shaft 48. Clockwise rotation of shaft 31, through pinion 33 and gear 34, rotates the bevel gear 36 counter-clockwise and, through planet gears 37 and 38 and gear 42, rotates shaft 35 clockwise at a speed determined in part by the position of the variable speed pulley. Also, clockwise rotation of shaft 48, through ring gear 46, revolves the planet gears 37 and 38 counter-clockwise around shaft 35, thus also taking part in determining the speed of shaft 35. The action of planet gears is so well known that further description is thought unnecessary, it being apparent that by varying the speed of rotation of shafts 31 and 48, the speed and direction of rotation of the output shaft 35 can be varied by simply changing the axial position of motor shaft 10.

While the forms of mechanisms herein shown and described are admirably adapted to fulfill the objects primarily stated, it is to be understood that it is not intended to confine the invention to the forms or embodiments herein disclosed, for it is susceptible of embodiment in various forms, all coming within the scope of the claims which follow.

What is claimed is:

1. In a device of the character described, a supporting member; a rotatable floating member slidable on the supporting member and rotatable therewith, said floating member provided with a plurality of flanges; another floating member slidably mounted on the supporting member between said flanges and movable relatively to the first floating member; connections between the two floating members to rotate the floating members in unison; and a plurality of V-belts traveling between said floating members to fix the relative positions of the floating members according to the path of travel of the belts.

2. In a device of the character described, a supporting member; a rotatable floating member slidable on the supporting member and rotatable therewith, said floating member provided with a plurality of flanges; another floating member slidably mounted on the supporting member between said flanges and movable relatively to the first floating member; connections between the two floating members to rotate the floating members in unison; a plurality of belts traveling in a fixed path within said flanges; and camming edges on each side of said belts to cam the floating members into positions determined by the path of travel of said belts.

3. In a device of the character described, a supporting member; a rotatable floating member slidable on the supporting member and rotatable therewith, said floating member provided with a plurality of flanges; another floating member slidably mounted on the supporting member between said flanges and movable relatively to the first floating member; connections between the two floating members to rotate the floating members in unison; a plurality of belts traveling in a fixed path; cam edges on said belts coacting with flanges at variable pitch diameters around said flanges; and means to shift the axial position of the supporting member to change the positions of the cam edges on the belts, said cam edges adapted to shift the floating members into alinement with the path of travel of the belts when the axial position of the supporting member is changed.

4. In a device of the character described, a supporting member; a rotatable floating member slidable on the supporting member and rotatable therewith, said floating member provided with a plurality of flanges; another floating member slidably mounted on the supporting member between said flanges and movable relatively to the first floating member; connections between the two floating members to rotate the floating members in unison; a plurality of belts traveling in a fixed path within said flanges and coacting with said floating members; means to carry said supporting member to vary the axial position of the supporting member; and camming edges on each side of said belts coacting with the floating members when the floating members are rotated to move the belts in a fixed path, said camming edges adapted to shift the floating members when the axial position of the supporting member is varied to adjust the floating members in accordance with the path of travel of the belts.

5. In a device of the character described, a driving shaft; means to carry the shaft, said means being movable to shift the axis of the shaft; a supporting member on the shaft; an expansible pulley consisting of two floating members each independently shiftable on said supporting member; and more than two V-belts, each side of said V belts coacting with the two floating members at variable pitch diameters thereon to shift the two floating members endwise to accommodate the floating members to the path of travel of the belts when the axis of the shaft is moved by said means.

6. In a device of the character described, a driving pulley; a driven pulley; a plurality of endless belts of the V type traveling respectively around said driving and driven pulleys; a shaft; a plurality of expansible pulleys of the V type on said shaft, including end flange members floating on said shaft and a floating intermediate flange member common to both expansible pulleys, said belts adapted to fix the distance between said end flange members and the intermediate member; and means to shift the axis of said shaft, said belts thereby coacting with the flange members to readjust the end flange members and the intermediate flange member in accordance with the path of the belts as determined by the driven pulley and the driving pulley.

7. In a device of the character described, a driving pulley; a driven pulley; a plurality of endless belts of the V type traveling respectively around said driving and driven pulleys; a shaft; a support for said shaft shiftable to move the axis of the shaft; a plurality of expansible pulleys of the V type on said shaft, including end flange members connected to revolve with said shaft but slidable along the shaft; an intermediate flange member common to both expansible pulleys, said intermediate flange member connected to the end flange members to revolve therewith but slidable relatively thereto; and means to shift the axis of said shaft and thereby shift the axis of the flange members to vary the effective sizes of said expansible pulleys in reverse order, said belts when traveling respectively around said pulleys adapted to shift the end flanges and the intermediate flange to accommodate the expansible pulleys to the path of travel of the belts as determined by the driven pulley and the driving pulleys.

8. In a device of the character described, a driving pulley; a driven pulley; a plurality of endless belts of the V type traveling respectively around said driving and driven pulleys; a shaft; a plurality of expansible pulleys of the V type on said shaft, including end flange members floating on said shaft but connected to rotate with the shaft; an intermediate flange member common to both expansible pulleys, said intermediate flange member connected to revolve with said end flange members but slidable to float between the end flange members; and means for axially shifting said shaft to vary the effective sizes of said expansible pulleys in reverse order, said belts traveling respectively around said expansible pulleys and adapted to coact with the end flanges and the intermediate flange to shift the flange into alinement with the path of travel of the belts simultaneously with the axial shifting of said shaft.

9. In a device of the character described, a driving pulley; a driven pulley; a plurality of endless belts of the V type traveling respectively around said driving and driven pulleys; a shaft; a plurality of expansible pulleys of the V type on said shaft, including end flange members floating on said shaft but connected to rotate with the shaft; an intermediate flange member common to both expansible pulleys, said intermediate flange member connected to revolve with said end flange members but slidable to float between the end flange members; and means for shifting said shaft at an angle to its axis, said belts coacting with the flanges to adjust the flanges into positions in line with the travel of the belts simultaneously and in synchronism with the axial shifting of said shaft.

10. In a device of the character described, a plurality of driven pulleys; a plurality of endless belts of the V type traveling respectively around said pulleys; a shaft; a plurality of expansible pulleys of the V type on said shaft, including end flange members floating on said shaft but connected to rotate with the shaft; an intermediate flange member common to both expansible pulleys, said intermediate flange member connected to revolve with said end flange members; power means to rotate the shaft; and means for axially shifting said shaft to vary the effective sizes of said expansible pulleys in reverse order, to vary the speed of rotation of the plurality of driven members, said belts traveling respectively around said expansible pulleys and adapted to coact with the flanges to shift the flanges into alinement with the path of travel of the belts simultaneously with the axial shifting of said shaft.

11. In a device of the character described, a plurality of driven pulleys; a plurality of endless belts of the V type traveling respectively around said pulleys; a shaft; a plurality of expansible pulleys of the V type on said shaft, including end flange members floating on said shaft but connected to rotate with the shaft; an intermediate flange member common to both expansible pulleys, said intermediate flange member connected to revolve with said end flange members; power means to rotate the shaft; means for axially shifting said shaft to vary the effective sizes of said expansible pulleys in reverse order, to vary the speed of rotation of the plurality of driven pulleys, said belts traveling respectively around said expansible pulleys and adapted to coact with the flanges to shift the flanges into alinement with the path of travel of the belts simultaneously with the axial shifting of said shaft; an output shaft; and a differential means operated by the plurality of driven pulleys and connected to the output shaft to vary the speed of rotation of the output shaft.

12. In a device of the character described, a plurality of driven pulleys; a plurality of endless belts of the V type traveling respectively around said pulleys; a shaft; a plurality of expansible pulleys of the V type on said shaft, including end flange members floating on said shaft but connected to rotate with the shaft; an intermediate flange member common to both expansible pulleys, said intermediate flange member connected to revolve with said end flange members; power means to rotate the shaft; means for axially shifting said shaft to vary the effective sizes of said expansible pulleys in reverse order, to vary the speed of rotation of the plurality of driven pulleys, said belts traveling respectively around said expansible pulleys and adapted to coact with the flanges to shift the flanges into alinement with the path of travel of the belts simultaneously with the axial shifting of said shaft; an output shaft; and means operated by the plurality of driven pulleys and comprising planet gears and sun gears to vary the speed of rotation of the output shaft in accordance with the speed of rotation of the driven shafts as determined by the axial position of the expansible pulleys.

13. In a device of the character described, a plurality of driven pulleys; a plurality of endless belts of the V type traveling respectively around said pulleys; a shaft; a plurality of expansible pulleys of the V type on said shaft, including end flange members floating on said shaft but connected to rotate with the shaft; an intermediate flange member common to both expansible pulleys, said intermediate flange member connected to revolve with said end flange members; power means to rotate the shaft; means for axially shifting said shaft to vary the effective sizes of said expansible pulleys in reverse order, to vary the speed of rotation of the plurality of driven pulleys, said belts traveling respectively around said expansible pulleys and adapted to coact with the flanges to shift the flanges into alinement with the path of travel of the belts simultaneously with the axial shifting of said shaft; an output shaft; a sun gear connected to one of the driven pulleys; a planet gear connected to the other one of the driven gears; connections between the sun gear and the output shaft; and connections between the planet gear and the output shaft to determine the speed and direction of rotation of the the output shaft.

14. In a device of the character described, a plurality of pulleys; a plurality of endless belts of the V type traveling respectively around said pulleys; a shaft; a plurality of expansible pulleys of the V type on said shaft, including end flange members floating on said shaft but connected to rotate with the shaft; an intermediate flange member common to both expansible pulleys, said intermediate flange member connected to revolve with said end flange members but slidable to float between the end flange members; and means to axially shift said shaft to vary the effective sizes of said expansible pulleys in the reverse order; said belts traveling respectively around said expansible pulleys and the said plurality of pulleys to cause all of the pulleys to move at the same time, said belts also coacting with the end flanges and the intermediate flange to shift the floating flanges into alinement with the belts, as determined by the said plurality of pulleys, simultaneously with the shifting of the axis of said shaft.

15. In a device of the character described, a plurality of sets of pulleys each set rotatable about parallel axes and providing a plurality of alined V grooves; a shaft; a set of expansible pulleys each providing a number of grooves equal to the number of grooves in each of said sets of pulleys, said expansible pulleys including outer flange members and intermediate flange members connected to rotate with said shaft but floating thereon to permit sidewise shifting of the flange members, said flanges forming grooves equal in number to the grooves of said sets of pulleys; a plurality of independent V-belts each having opposite continuous side driving surface portions cooperable with the side surfaces of said sets of grooves and with the side of said flanges; and means to axially shift said shaft to vary the effective diameter of the expansible pulleys; said belts adapted to move the flanges to bring the grooves formed thereby into alinement with the grooves of said sets of pulleys simultaneously with the axial shifting of said shaft.

WALLACE C. HERMAN.